Patented June 4, 1935

2,003,850

UNITED STATES PATENT OFFICE 2,003,850

COLORED GRANULE AND METHOD OF MAKING SAME

William H. Alton, New York, N. Y., assignor to R. T. Vanderbilt Company, Incorporated, New York, N. Y., a corporation of New York No Drawing. Application December 2, 1933, Serial No. 700,759

6 Claims. (Cl. 91—70)

This invention relates to new colored granules suitable for various decorative purposes and includes both the new granules and the improved method of producing them.

The new granules are produced from clay or shale, etc. by treating the granules with a solution of sodium silicate containing the pigment or coloring material, then treating the coated granules with a solution which converts the soluble silicate into insoluble calcium silicate and then firing the resulting granules to give improved colored granules.

The clay or shale used is of a character which either with or without drying can be broken up into particles of granule size. With shales preliminary drying is not ordinarily needed. With some clays some drying should precede the crushing and sizing. After crushing the material is screened to obtain particles of granule size and separated from the finer material which can be used, e. g., for brick manufacture and from the coarser pieces which may be further crushed.

In some cases the granule particles thus obtained are treated directly with the silicate and coloring matter. In some cases it is advantageous to calcine the granules first to a temperature of around 1400 to 2000° F. to drive off water of combination and make the granules somewhat more dense and porous.

The granules, either without or with such preliminary calcining, are treated with a solution of sodium silicate of e. g. 40° Bé., which may be a standard silicate solution of low silica and high soda ratio and which is sufficiently thin and free flowing to surround and coat the granules. An amount of solution equal to around 10% of the weight of the granules may be used although the amount can be increased or decreased. The pigments or coloring materials, or the materials from which the pigments or coloring materials are to be developed by subsequent calcining, are mixed with the silicate solution before it is applied using an amount e. g. equal to about 1 to 2% by weight of the weight of the granules coated. The proportions of silicate and pigment are such that the granules are coated and the surfaces of the granules are to some extent penetrated by the silicate and coloring material and the pores of the granules are more or less filled therewith.

The coloring material can be ground with the silicate solution first to secure intimate mixture, using, e. g., a ball mill for this purpose. As an example I may use about 60 pounds of 39° Bé. waterglass, about 20 pounds of chromium green, and 44 pounds of pyrophyllite, and grind these together in a ball mill.

When the granules are coated with the silicate and pigment coating, the coated granules are sticky and tend to stick together to an objectionable extent. In order to further treat these coated granules they are advantageously screened through a screen which permits only individual granules to pass therethrough and the individual granules are then dropped directly into a precipitating solution such as a solution of 20° Bé. calcium chloride. This solution acts at once on the coated granules and destroys their sticky nature so that they no longer tend to stick together. The calcium chloride reacts with the sodium silicate to form calcium silicate and sodium chloride. The sodium chloride will be in part removed with the excess of the precipitating solution and the granules may be further washed to wash out more or all of the remaining soluble salts, although in some cases the sodium chloride is advantageously left behind to aid in the fluxing or glazing during the subsequent calcining treatment.

The non-sticky granules with their calcium silicate coating having the coloring matter intimately combined therewith, are subjected to a calcining treatment at a temperature e. g. around 1500 to 1900° F. and best at the temperature around 1600° F. During this calcining treatment there appears to be a complex reaction which takes place between the silicate coating and the material of the granule so that a permanently colored coating is obtained. Apparently no fusion or glazing takes place, particularly where the soluble salts are washed out before calcining. Where a coating is desired which is fused or glazed suitable amounts of alkali flux may be used and the temperature so regulated as to obtain fusion or glazing. In general I consider it more advantageous to carry out the calcining under conditions where the complex reactions take place without fusion and the production of a glazed product.

Clay and shales frequently contain iron in varying amounts and, during the preliminary calcination the iron is largely or entirely converted into a magnetic state, even though it may not be present in that state before calcining. The calcined material is advantageously subjected to a treatment to separate the magnetic iron particles, e. g. with an electromagnetic separator, thereby reducing or eliminating iron from the granules so as to avoid or minimize the coloring of the granules by iron compounds. By removing or minimizing the iron in this way the color of the granules can be better controlled where other colors than that due to iron are desired, e. g., a green chromium color.

The size of the granules can be regulated by the screening treatment. For roofing granules the size may range from e. g., about 10 mesh down to e. g. about 35 mesh. Waste materials of various kinds can be used for the granules. While shales and clays are advantageous for certain purposes, other materials such as quarry wastes, trap rock, pyrophyllite or calcined pyrophyllite, talc, soapstone, slate, etc. can be similarly used. Where the material is contaminated with iron, and where discoloration due to iron is objectionable, a preliminary calcination of the various materials to convert the iron into a form such that it can be eliminated by magnetic separation, and the removal or elimination of all or part of the iron by magnetic separation is advantageously effected. The roasted granules which are badly discolored by iron can thus be removed by magnetic separation from the roasted material before applying the colored coating thereto.

With a coating made by applying a silicate solution of a sticky or adhesive character there are important advantages in separating the individual particles so that they do not adhere to each other at the time they enter the precipitating solution. This is readily accomplished by screening the coated granules through a screen of proper size and permitting them to fall directly into the precipitating solution. Solutions of precipitating salts such as zinc or calcium chloride, aluminum sulfate, etc. will readily react with the gelatinous silica or silicate and precipitate it on the granules as an insoluble silicate thereby preventing the granules from subsequently sticking or adhering to each other. The subsequent calcining of the non-adhering coated granules converts the coating into a permanent or stable form through the complex reactions which occur during the calcining treatment.

The resulting granules are accordingly granules having a complex silicate coating with the coloring material forming a part thereof and physically admixed or chemically combined therewith as a result of the reactions which occur during the calcining treatment.

I claim:

1. The method of making colored granules which comprises coating granules with a solution of sodium silicate carrying coloring material, treating the coated granules with a precipitating salt solution to convert the soluble silicate into an insoluble silicate, washing the granules to remove water-soluble salts and calcining the resulting granules at a temperature sufficiently high to cause a reaction to take place between the silicate coating and the material of the granule so that a permanently colored coating is obtained.

2. The method of producing granules which comprises crushing clay or shale and screening the crushed material to separate the granule fraction therefrom, coating granules with a solution of a sodium silicate carrying coloring material, treating the coated granules with a precipitating salt solution to convert the soluble silicate into an insoluble silicate, washing the granules to remove water-soluble salts and calcining the resulting granules at a temperature above about 1500° F.

3. The further improvement in the process of claim 2 in which the clay or shale granules are first calcined before treatment with the silicate and coloring material with a subsequent calcining treatment after such treatment.

4. The improvement in the production of granules which comprises applying thereto a soluble silicate and coloring material to give coated granules tending to adhere to each other, screening the coated granules through a screen that permits individual granules to pass therethrough and dropping the individual granules into a solution of a precipitating salt capable of reacting with the sticky silicate to convert it into a non-sticky silicate.

5. Colored granules made in accordance with the method set forth in claim 1.

6. Colored granules made in accordance with the method set forth in claim 4.

WILLIAM H. ALTON.